United States Patent [19]

Nishitani

[11] Patent Number: 5,127,722
[45] Date of Patent: Jul. 7, 1992

[54] PROJECTION SCREEN DEVICE

[76] Inventor: Tatsuro Nishitani, 6-301, Ichibancho 20-banchi, Chiyoda-ku, Tokyo 102, Japan

[21] Appl. No.: 538,029

[22] Filed: Jun. 13, 1990

[30] Foreign Application Priority Data

Jun. 16, 1989 [JP] Japan .................................. 1-152209

[51] Int. Cl.⁵ .............................................. G03B 21/56
[52] U.S. Cl. ...................................................... 359/443
[58] Field of Search .......................................... 350/117

[56] References Cited

U.S. PATENT DOCUMENTS

| 3,720,455 | 3/1973 | Sahlin | 350/117 |
| 4,022,522 | 5/1977 | Rain | 350/117 |
| 4,323,301 | 4/1982 | Spector | 350/117 |
| 4,339,175 | 7/1982 | Asterö | 350/117 X |

FOREIGN PATENT DOCUMENTS 47-27893 7/1972 Japan .
47-39894 10/1972 Japan .
48-6972 3/1973 Japan .
48-26534 8/1973 Japan .

Primary Examiner—Richard A. Wintercorn

[57] ABSTRACT

There is disclosed a projection screen device having a high luminance adapted for use in an overhead projector, a video projector or a liquid crystal projector. The projection screen device comprises a flexible screen film and an endless circumfernetial frame tube (hereinafter referred to as frame tube) having at least a flexible characteristic and being tightly connected with an entire circumferential edge of the screen film, the frame tube being expanded by introduction of fluid under pressure so that the screen film is stretched under tension across the frame tube. The screen film comprises a reflection film and a lens film formed in front of the reflection film for reflecting an incident light, the lens film composed of a first group of lenses for expanding the reflected light both rightward and leftward and a second group of lenses for collecting vertical reflected light horizontally, the lens film being subjected to a minute mat on the entire surface thereof.

9 Claims, 7 Drawing Sheets

FIG. 2(a)
FIG. 2(b)
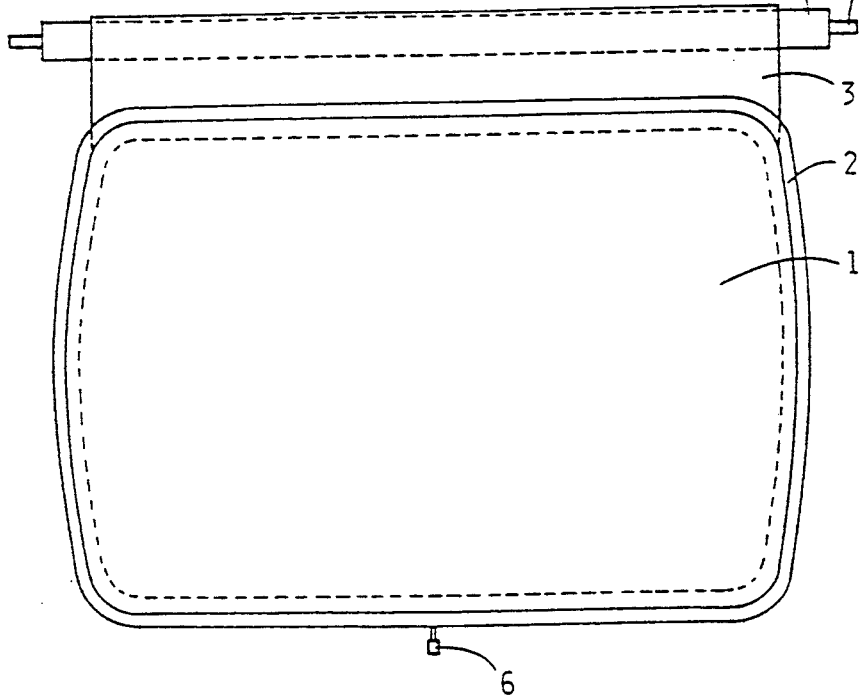
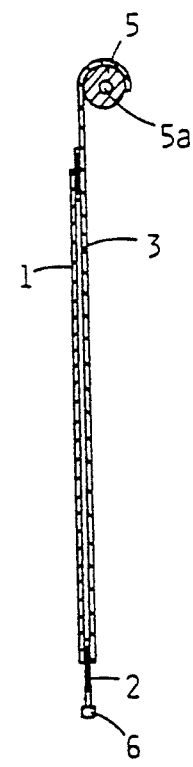

FIG. 7(a)
FIG. 7(b)
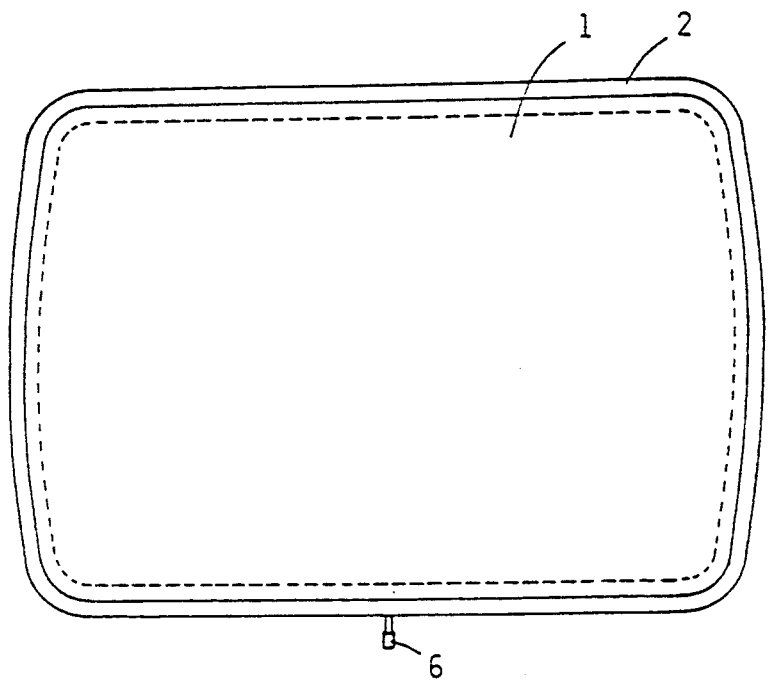
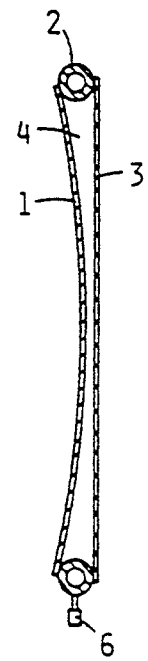
FIG. 7(c)
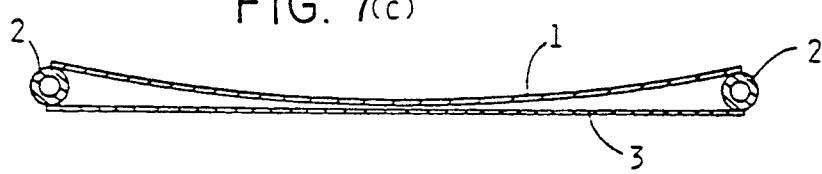
FIG. 7(d)
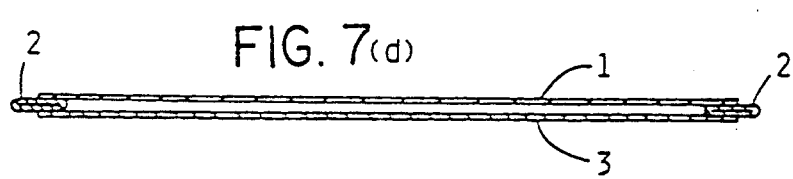

PROJECTION SCREEN DEVICE

BACKGROUND OF THE INVENTION

1. Field of the Invention

The present invention relates to a projection screen device having a high luminance adapted for use in an overhead projector, a video projector or a liquid crystal projector.

2. Prior Art

A screen film of a projection screen device is subjected to a minute mat processing for forming a superior image on the surface of the screen film. The screen film is classified into a reflection type (i.e. opaque screen) and a transmission type according to an image formation, a flat type and a curve type (concave surface) according to the cross section of the screen, and a nondeformable type and deformable type according to the manner of storage thereof when not used. As the deformable type, there are folding manner and winding manner. A combination of these types form various types.

There has been conventionally, as the image reflection screen, adopted a white cloth or a vinyl cloth having glass powder or alminium powder etc. respectively applied thereon so that the image incident light is reflected bright in all directions. However, the opaque screen also reflects the light other than the image light, hence, there was a problem that both the lights are mixed to reduce the contrast of the image and make the image blur. Accordingly, the projection screen was usually placed at a dark place. The opaque screen has a luminence gain of less than 4, low directional characteristic, and is obtrusive in slight unevenness or wrinkle or warp thereon, and can be reduced in its size by winding thereof when not used or carried.

There is a demand to project on a screen in the light at all circumstances which entails to need a screen film capable of an excellent image having a high contrast.

To meet the demand, the opaque screen film reflects the image light projected by the projector effectively to be equally caught by a number of audience. Furthermore, only the image light projected by the projector is to be reflected toward the audience and the light other than the image light shall be reflected in the direction except the audience.

Hence, the light incident to and reflected by the screen film is required to have strong directional characteristic, namely, reflectance toward the audience. Particularly, in the projector for projecting and expanding an image light of a weak luminous intensity such as VP or LCP, the luminous intensity of the image light on the screen is weak, hence the reflectance toward the audience is needed to be improved.

For this purpose, there has been proposed a screen film having a high luminance which employs a reflection film having high reflectance such as an aluminium foil or a film evaporated by alminium and a lens subjected to cylindrical embossed processing is provided in front of the reflection film so that the luminous gain becomes over 10 and the reflection surface is formed in a concave as a primary curve (laterally arc shaped) or a secondary curve (longitudinally arc shaped) so that the reflective direction is restricted.

However, the reflection-concave type screen film requires a complete smooth flat shape since the reflection film surface is high luminous and there is a likelihood of generating a local excessive light and darkness in the part of the image projected on the screen even if slight unevenness, distortion, wrinkle, or slack appear on the screen film.

Accordingly, there has been conventionally adopted the screen film having the property set forth above which is attached to a rigid plate body made of a metal or synthetic resin, etc. having a flat and undeformable surface, and the screen film attached to the metal and the like is fixed to a fixed frame. Hence, the screen film was the undeformable type.

The conventional deformable type screen film requires a rigid plate body to support thereof and is impossible to be wound or disassembled and inconvenient in carrying, storing, attaching thereof and the like. Particularly, inasmuch as there is recently increased a demand for a large screen in view of development of an image information apparatus, the problem of the deformable type screen device is serious.

SUMMARY OF THE INVENTION

The present invention has been made to solve the problem of the conventional deformable type screen device.

It is therefore an object of the present invention to provide a projection screen device having a luminous gain exceeding 10 and capable of realizing a large screen having a flat surface and easy for carrying, storing, attaching thereof, and adapted for both the reflection and transmission type.

To achieve the above object, the projection screen device according to the present invention comprises a flexible screen film and an endless circumferential frame tube (hereinafter referred to as frame tube) having at least a flexible characteristic and being tightly connected with an entire circumferential edges of the screen film, the frame tube being expanded by introduction of fluid under pressure so that the screen film is stretched under tension across the frame tube.

The above and other objects, features and advantages of the present invention will become more apparent from the following description taken in conjunction with the accompanying drawings.

BRIEF DESCRIPTION OF THE DRAWINGS

FIG. 1(b) is a vertical cross sectional view of FIG. 1(a) viewed from one end thereof;

FIG. 2(a) is a front elevational view of a projection screen device of FIG. 1(a) in which a frame tube, a constituent thereof, is contracted;

FIG. 2(b) is a vertical cross sectional view of FIG. 2(a) viewed end thereof;

FIG. 7(a) is a front elevational view of a projection screen device according to a second embodiment of the present invention;

FIG. 7(b) is a vertical cross sectional view of FIG. 7(a), viewed from one end thereof;

FIG. 7(c) is a horizontal cross sectional view of FIG. 7(a), viewed from one end thereof;

FIG. 7(d) is a horizontal cross sectional view of FIG. 7(a), viewed from one end thereof, in which a frame tube is contracted;

DESCRIPTION OF THE PREFERRED EMBODIMENT

First Embodiment (FIGS. 1 to 6)

Figure 1A:
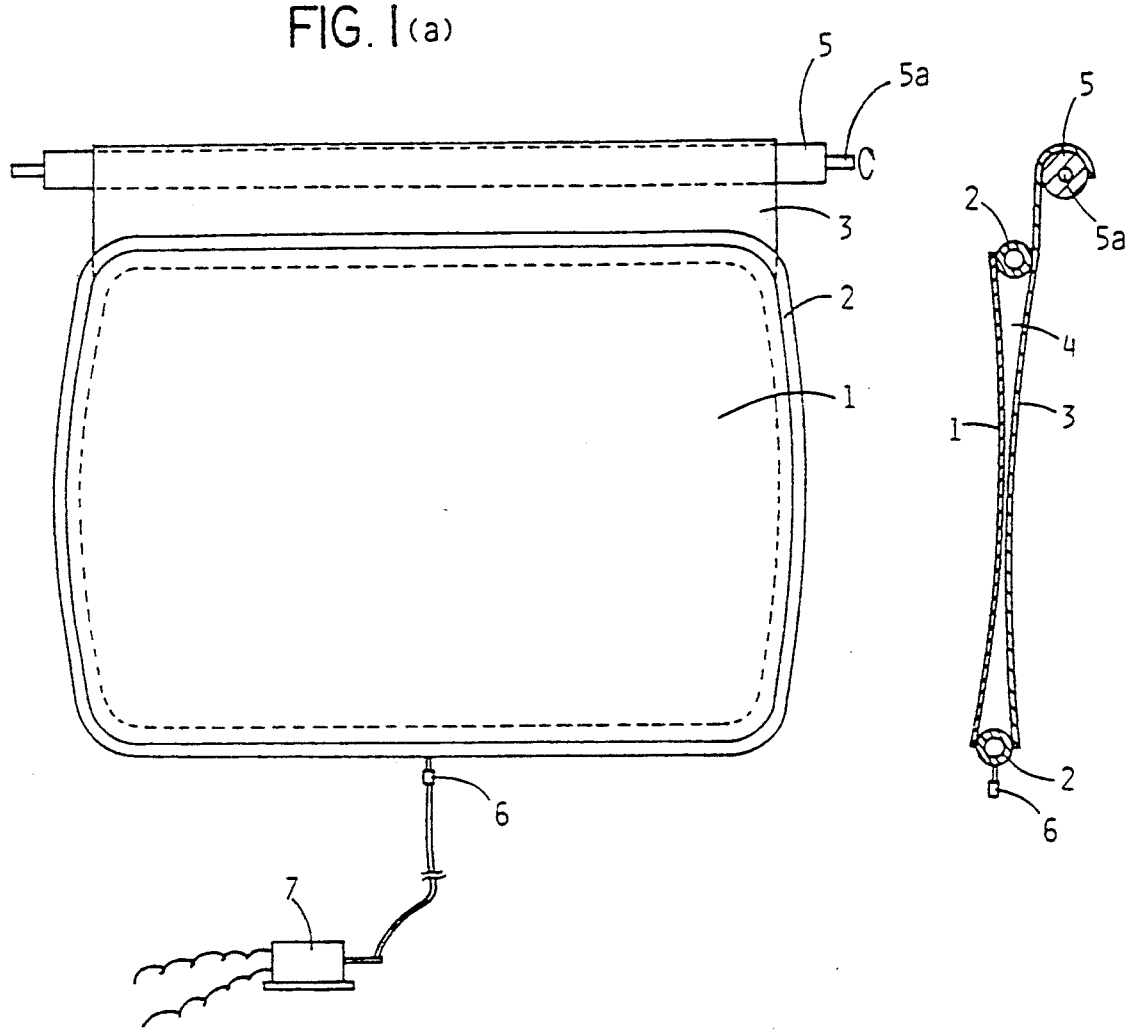
FIG. 1(a) is a front elevational view of a projection screen device according to a first embodiment of the present invention.
Figure 3A:
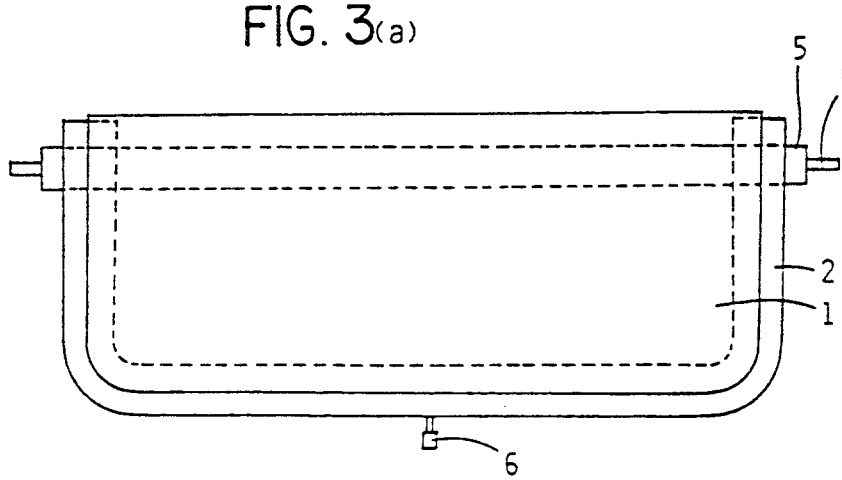
FIG. 3(a) is a front elevational view of a projection screen device of FIG. 1(a) in which part of a screen film, a constituent thereof, is wound.
Figure 3B:
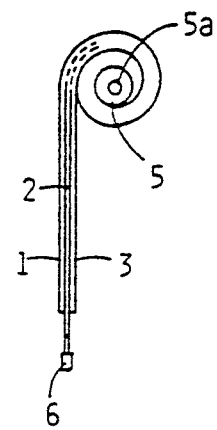
FIG. 3(b) is a side elevational view of FIG. 3(a)

A screen device according to a first embodiment of the present invention will be described with reference to FIGS. 1 to 6.

The projection screen device comprises a flexible screen film 1 and an endless circumferential frame tube (hereinafter referred to as frame tube) 2 having at least a flexible characteristic and being tightly connected with the circumference of the screen film 1. The frame tube 2 is expanded by introduction of fluid under high pressure so that the screen film 1 is tensioned to be stretched across the frame tube 2. The frame tube 2 has the screen film 1 at one side and a base film 3 at the other side confronting the screen film 1 respectively tightly connected therewith, wherein the screen film 1 is formed in concave by allowing an inner space surrounded by both films 1, 3 and the frame tube 2 to be negatively pressurized.

The projection screen device will be described more in detail.

The projection screen device 1 having substantially rectangular shape (e.g. ratio of width relative to length is 4 : 3) comprises a flexible substrate made of polyester and the like and a reflection film covering the substate by subjecting it to alminium evaporation and the like. The frame tube 2 has the endless circular shape and is tightly connected with the circumference of the screen device 1. The frame tube is made of a flexible elastic member such as synthetic rubber or chloride vinyl and capable of introducing therein fluid such as air and oil under pressure.

FIGS. 1(a), (b) show a state where the fluid under pressure is introduced in the frame tube 2. When the fluid under pressure is discharged, the frame tube 2 is formed in the shape of the plate as illustrated in FIG. 2(b) (refer to FIGS. 5(a), (b)). The base film 3 is an air tight sheet coated by chloride vinyl or leather which is confronting and tightly connected with the rear side of the frame tube 2. The upper portion of the base film 3 extends from the upper end of the frame tube 2.

Figure 5A:
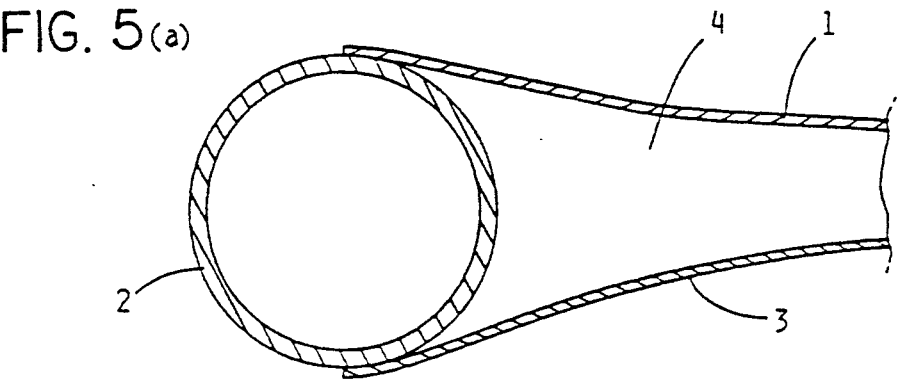
FIGS. 5(a), (b) are respectively enlarged cross sectional views of the frame tube of FIG. 1(a)
Figure 5B:
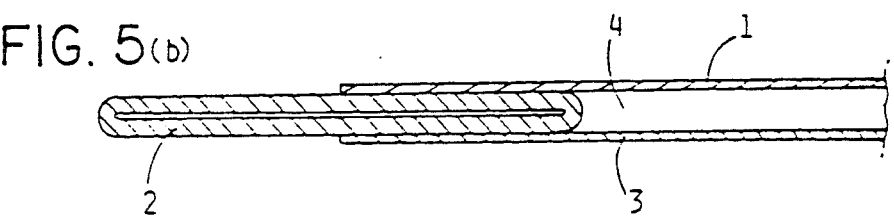
Figure 6A:
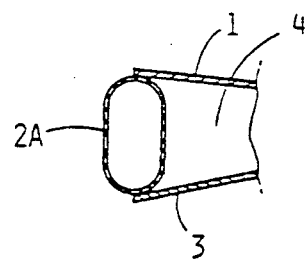
FIGS. 6(a), (b) are respectively modified views of the frame tube of FIG. 1(a)
Figure 6B:
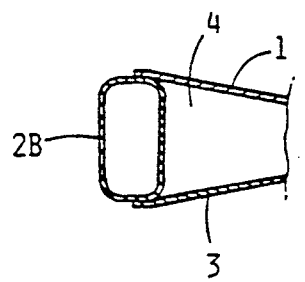

The position where the base film 3 comes into contact with the frame tube 2 is just opposite to the position where the screen film 1 comes into contact with the frame tube 2, namely, opposite at 180° of angle of the circumeference of the frame tube (refer to FIG. 5(a)). In the arrangement set forth above, a narrow space surrounded by the screen film 1, the frame tube 2 and the base film 3 is completely air tight.

A winding shaft 5 is attached to the upper edge of the base film 3 and is rotatably supported by a core 5a mounted on the central portion thereof. The core 5a is supported by a supporter, etc. (not shown).

The fluid is introduced into under pressure or discharged from the frame tube 2 via a valve 6 provided at one end (e.g. bottom edge) of the frame tube 2. The valve 6 is detachable to a reversible pump 7 or a manual pump (now shown) for introducing the fluid into or discharging the fluid from the frame tube 2.

If the air under pressure is introduced into the frame tube 2 via the valve 6 by actuating the reversible pump 7, there is generated the force to expand outward in the frame tube 2 on the basis of the operation of the Bourdon tube, hence the frame tube 2 starts to expand and becomes rigid. As a result, both the screen film 1 and the base film 3 are stretched tightly in the entire surfaces thereof in all directions to form the smooth surface. The inner space surrounded by the screen film 1, the base film 3 and the frame tube 2 is negatively pressurized, hence the screen film 1 and the base film 3 close with each other at the central portions thereof. The diameter of the frame tube 2 increases due to expansion thereof, hence the screen film 1 and the base film 3 are moved away from each other. As a consequence, the screen film 1 is concave toward the base film 3 at the central portion thereof. The curvature of the screen film 1 can be adjusted in the following manners.

Firstly, the amount of the air under pressure to be introduced into the frame tube 2 is adjusted. If the amount of the air under pressure to be introduced into the frame tube 2 is increased, the frame tube 2 expands to increase its diameter whereby the curvature decreases.

Secondly, balance of flexibility of the screen film 1 relative to the base film 3 is adjusted. If the screen film 1 is made of a flexible material and the base film 3 is made of a inflexible material such as polyester, the screen film 1 is excessively concave while the base film 3 is substantially flat (refer to FIG. 7 of a second Embodiment).

Thirdly, size and shape of the frame tube 2 are changed. For example, if the diameter of the frame tube 2 is increased or the cross section of the frame tube 2 is varied so that the width of the frame tube 2 is increased such as those denoted at 2A, 2B illustrated in FIGS. 6(a), (b), a spaced distance between the screen film 1 and the base film 3 is increased and the curvature of the screen film 1 is decreased.

Fourthly, the amount of air in the inner space 4 is adjusted. For example, if the amount of air to be introduced in the inner space 4 is reduced (inlet and outlet means are not shown), the air under pressure in the inner space is further reduced and the curvature of the screen film 1 is reduced accompanied by the reduction of the pressure. If a ventilation hole is provided to communicate between the inner space 4 and the outside, the pressure in the inner space is reduced, the screen film 1 and the base film 3 are kept stretched flat at all times.

The screen film 1 having such structure is forcibly stretched outward at the entire circumferential edge thereof, hence the entire surface is tensioned to be stretched to form the smooth surface. The smooth surface is facilitated with ease to be concave or flat. The thus structured screen can be used as the projection screen device. When used as the projection screen device, the valve 6 is closed not to leak the fluid under pressure in the frame tube 2 and the reversible pump 7 can be detatched from the valve 6.

Figure 4A:
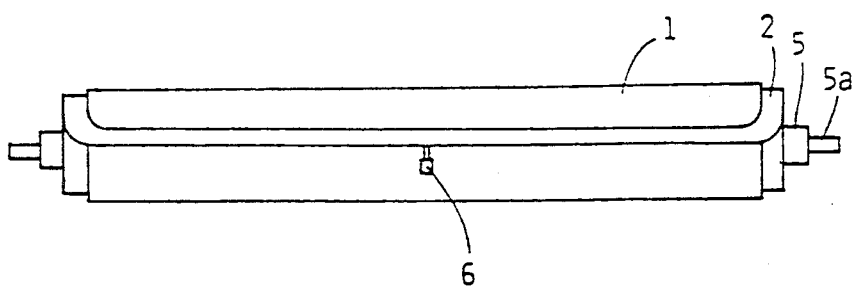
FIG. 4(a) is a front elevational view of a projection screen, device of FIG. 1(a) in which the screen film is wound completely.

When the projection screen device is not used, it can be folded and accommondated with ease in the following manner. Firstly, the reversible pump 7 is reversibly rotated to discharge the fluid in the frame tube 2. As a result, the frame tube 2 contracts and is formed as the plate and flexible while both the screen 1 and the base film 3 are slackened. That is, the projection screen device is formed in a flexible sheet as a whole. Thereafter, the reversible pump 7 is detached from the valve 6 and the winding shaft 5 is rotated to wind the base film 3 which entails to wind the screen film 1 and the frame tube 2 (refer to FIGS. 3(a), (b); FIGS. 4(a), (b)). The projection screen device thus wound is formed like a bar which is convenient for carrying, storing and accommodating thereof.

Figure 4B:
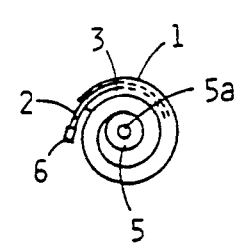
FIG. 4(b) is a side elevational view of FIG. 4(a)

When the projection screen device is used from this folded state, the operation reverse to the operation set forth above can be taken. That is, the projection screen device can be unfolded in the manner as illustrated in FIG. 4→FIG. 3→FIG. 2→FIG. 1.

When the screen film 1 is wound, no friction is generated between the screen film 1 and the base film 3 and no folding wrinkle is generated since there is left the thickness of the collapsed frame tube 2 at the upper and the lower portions and the left and the right sides of the circumference of the screen film 1.

Second Embodiment (FIG. 7)

A projection screen device according to a second embodiment of the present invention will be described with reference to FIG. 7. The elements which are same as those of the first embodiment are designated at the same numerals.

The projection screen device comprises the same elements as that of the first embodiment except that firstly, the screen film 1 has an excessive concave and the base film 3 is flat to facilitate to keep the excessive concave of the screen film 1, and secondly, no winding shaft is provided. Hence, the projection screen device is supported by a wall of the building structure, etc. with use of a supporting member such as a bar, etc. or hung. The projection screen device is light in weight as a whole, hence it is handled with ease. The projection screen device can be carried by winding it around a separate winding shaft.

Figure 8A:
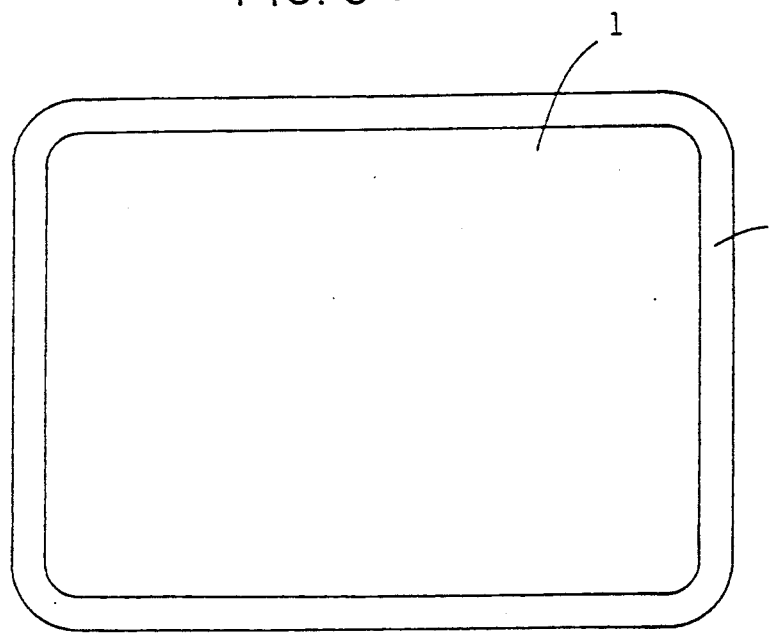
FIG. 8(a) is a front elevational view of a projection screen device according to a third embodiment of the present invention.
Figure 8B:
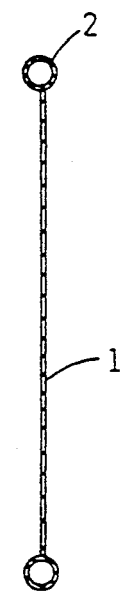
FIG. 8(b) is a vertical cross sectional view of FIG. 8(a)
Figure 8C:
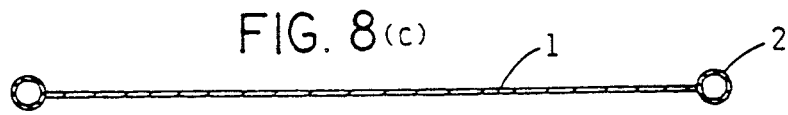
FIG. 8(c) is a horizontal cross sectional view of FIG. 8(a)

Third Embodiment (FIG. 8)

A projection screen device according to a third embodiment of the present invention will be described with reference to FIG. 8. The elements which are same as those of the first embodiment are designated at the same numerals.

The projection screen device comprises the screen film 1 and the frame tube 2 with which the screen film 1 is brought into contact and held thereby. The base film 3 and the winding shaft 5 are omitted. The screen device becomes flat type and adapted for both the reflection type and the transmission type.

The reflection-concave type screen film as explained in the first and the second embodiments can brighten the image as a whole. However, if the image is brought into focus on the central portion of the screen device, there is a problem that the four corners are out of focus to thereby generate deformation. This is caused by the design of the projection screen device which inherently projects the image on the flat screen to be focused in order. That is, the curvature of the first and the second curves of the concave screen relates to the distance between the projector screen device and the screen film. Shorter the distance, smaller the curvature and longer the distance larger the curvature. It is necessary to shorten the distance between the projector and the screen film to obtain bright images to thereby reduce the curvature. If the curvature is smaller, there generates distortion in the four corners of the screen which is caused by the difference of the curvature between the concave screen and the imaginary flat screen, which entails the deformation phenomenon.

In the reflection (or transmission) type screen, the image is in focus as a whole with ease but the four corners are liable to be dark. The flat and the concave type screen have respectively advantages and disadvanates.

Figure 9A:
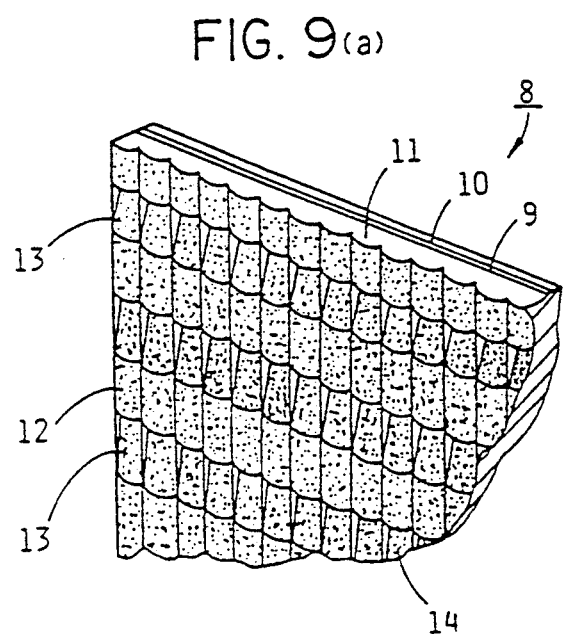
FIG. 9(a) is a perspective view of a screen film partly cut away of a projection screen device according to a fourth embodiment of the present invention.
Figure 9B:
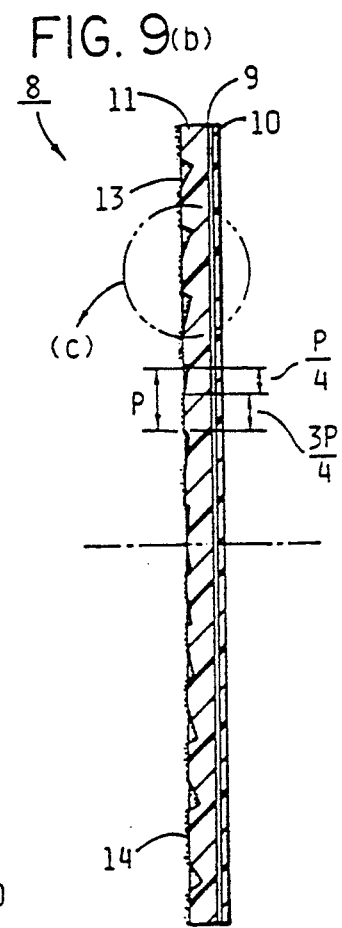
FIG. 9(b) is a vertical cross sectional view of FIG. 9(a)
Figure 9C:
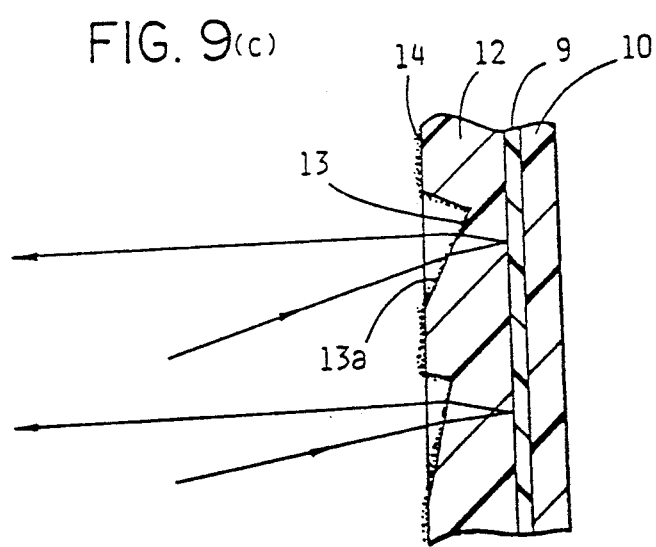
FIG. 9(c) is a view of assistance in explaining a notched portion of FIG. 9(a).

Fourth Embodiment (FIGS. 9(a) to (c))

A projection screen device according to a fourth embodiment of the present invention will be described with reference to FIGS. 9(a), (b).

The screen film of the projection screen device is characterized in that it comprises a reflection film 9 and a lens film 11 formed in front of the reflection film 9 for reflecting an incident light, the lens film 11 composed of a first group of lenses for expanding the reflected light both rightward and leftward and a second group of lenses for collecting vertical reflected light horizontally, each lens film being subjected to a minute mat on the entire surfaces thereof. The first group of lenses are formed by a plurality of cylindrical embossed lenses 12 disposed in parallel with each other and the second group of lenses are directed upward at the upper side of the central portions thereof and downward at the lower side of the central portions thereof.

The projection screen film will be described more in detail. The frame tube is omitted. A screen film 8 comprises a vinyl 10 (thickness of 100 μm), a reflection film 9 composed of a transfer layer and attached to the vinyl 10 and a lens film 11 adhered to the front of the reflection film 9 and composed of a vinyl (thickness of 200 μm). The lens film 11 of the screen film 8 is subjected to a cylindrical embossing process to form a plurality of clyindrical embossed lenses 12. Each embossed lens 12 has a concave having the secondary curve wherein the reflection light is not vertically dispersed.

In the present embodiment, no secondary curve is formed but lenses having same effect as the secondary curve are employed in the lens film 11. That is, each cylindrical embossed lens 12 disposed in parallel in the density of 9 to 12 pieces/mm or more is notched like a wedge, so-called Fresnel lens. The bottom of the notch 13 is deeper as it is remote from the upper and lower portions of the notch 13, namely, remoter the distance deeper the bottom. Furthermore, each notch 13 has an inclined or slanting surface 13a directed to an outside of the notch 13 (upward at the central upper portion and downward at the central lower portion) and the notch 13 is defined in the manner that the slanting surface 13a of the notch 13 becomes sharp as it is remote from the central portion thereof. The ratio between the notch 13 and the cylindrical embossed lens 12 is ¼ P (longitudinal length):¾P, where P is a pitch of the notch 13. The slanting surfaces incline less steeply inwardly in correspondence to their relative proximity to the central portion of the lens film 11.

The cylindrical embossed lens 12 effects such an optical operation that it reflects the incident light by the reflection film 9 and expands the thus reflected light right and leftward. The notch 13 effects such an optical operation that it changes the reflected light into substantially horizontal light (central upper portion in FIG. 9(c)). As a result, even if the screen film is placed flatly, the reflected light is not liable to disperse upward and downward to thereby keep the high brightness or luminance gain. Furthermore, since the reflection surface is flat, the image is not liable to be out of focus at the corners of the screen to thereby generate the deformation.

It is preferable to have such flat screen film. However, if the angle of collecting the reflection light, which is directed upward or downward due to the perfomance of angle of view for each projector, is excessive or deficient, the curvature of the screen film can be adjusted more or less within the extent not to generate the deformation as explained in the first and the second embodiments.

Although the fourth embodiment as illustrated in FIG. 9 relates to the reflection type, it is possible to form the transmission type eliminating the reflection film 9 to leave only the lens film 11 or a combination of lens film 11 and a transparent base film having no function of lens.

It is of course natural that the screen films as set forth in the first to fourth embodiments can be subjected to a minute mat processing at the surfaces thereof.

According to the projection screen device according to the present invention, it is possible to reduce the weight of the projection screen device, to simplify the mechanism, to facilitate to carry, store and attach even if the screen film has a size of 300 inch long by 500 inches wide. Furthermore, it is possible to make the screen film smooth or flat or curved with ease or make the screen film concave matching the optimum distance from the projector. Still furthermore, the projection screen device can be adapted for the reflection type or the transmission type.

Although the invention has been described in its preferred form with a certain degree of particularity, it is to be understood that many variations and changes are possible in the invention without departing from the scope thereof.

What is claimed is:

1. A projection screen device comprising:
   a flexible screen film which includes a reflection film and a lens film formed in front of the reflection film for reflecting incident light, the lens film composed of a first group of lenses for expanding the reflected light both rightward and leftward and a second group of lenses for directing vertical reflected light horizontally, said lens film being subjected to a minute mat on the entire surface thereof; and
   an endless circumferential frame tube having at least a flexible characteristic and being tightly connected with an entire circumferential edge of the screen film, the frame tube being expanded by introduction of fluid under pressure so that the screen film is tensioned to be stretched across the frame tube.

2. A projection screen device according to claim 1, wherein the frame tube has the screen film at one side and a base film at the other side confronting the screen film respectively tightly connected therewith, wherein the screen film is formed in concave by allowing an inner space surrounded by both films and the frame tube to be negatively pressurized.

3. A projection screen device according to claim 1, wherein the first group of lenses are formed by a plurality of cylindrical embossed lenses disposed in parallel with each other and the second group of lenses are directed upward at the upper side of the central portions thereof and downward at the lower side of the central portion thereof.

4. A projection screen device according to claim 3, wherein the second group of lenses have inwardly extending slanting surfaces which progressively deepen as they extend away from the top and bottom portions thereof.

5. A projection screen device comprising:
   a flexible screen film which includes a lens film composed of a first group of lenses for transmitting incident light therethrough by expanding the same light rightward and leftward, and a second group of lenses for transmitting the incident light therethrough as horizontal light, said lens film being subjected to a minute mat on the entire surface thereof; and
   an endless circumferential frame tube having at least a flexible characteristic and being tightly connected with an entire circumferential edge of the screen film, the frame tube being expanded by introduction of fluid under pressure so that the screen film is tensioned to be stretched across the frame tube.

6. A projection screen device according to claim 5, wherein the first group of lenses comprises a plurality of cylindrical embossed lenses arranged in parallel with each other and the second group of lenses have slanting surfaces which are directed upward at the upper side of the central portion thereof and downward at the lower side of the central portion thereof.

7. A projection screen device according to claim 6, wherein the second group of lenses have said slanting surfaces each provided with an angle of inclination which becomes larger as they are further upward or downward from the central portion thereof.

8. A projection screen device according to claim 5, wherein each said lens of the second group has an inwardly inclined slanting surface, said slanting surfaces being relatively less steeply inclined in correspondence to their relative proximity to a central portion of said lens film.

9. A projection screen device according to claim 1, wherein each said lens of the second group has an inwardly inclined slanting surface, said slanting surfaces being relatively less steeply inclined in correspondence to their relative proximity to a central portion of said lens film.

* * * * *